United States Patent
Gustavsson et al.

(10) Patent No.: US 7,158,170 B2
(45) Date of Patent: Jan. 2, 2007

(54) TEST SYSTEM FOR CAMERA MODULES

(75) Inventors: Lars Gustavsson, Dalby (SE); Anders Johannesson, Höllviken (SE); Henrik Telander, Malmö (SE)

(73) Assignee: Dialog Imaging Systems GmbH, Kirchheim/Teck-Nabern (DE)

( * ) Notice: Subject to any disclaimer, the term of this patent is extended or adjusted under 35 U.S.C. 154(b) by 740 days.

(21) Appl. No.: 10/434,743

(22) Filed: May 8, 2003

(65) Prior Publication Data

US 2004/0189812 A1    Sep. 30, 2004

(30) Foreign Application Priority Data

Mar. 27, 2003  (EP) ................................. 03392003

(51) Int. Cl.
*H04N 17/02* (2006.01)
(52) U.S. Cl. .................. 348/187; 348/335; 438/14; 438/15; 438/16; 438/17; 356/124
(58) Field of Classification Search ........ 348/180–190, 348/335, 340, 345; 356/124, 125, 127, 138, 356/139.04, 139.06, 239.2; 73/1.41, 1.56; 438/14–18
See application file for complete search history.

(56) References Cited

U.S. PATENT DOCUMENTS

| | | | | |
|---|---|---|---|---|
| 4,760,447 A | * | 7/1988 | Koka et al. ................. | 348/184 |
| 4,991,007 A | * | 2/1991 | Corley ....................... | 348/188 |
| 5,033,015 A | * | 7/1991 | Zwirn ........................ | 702/116 |
| 5,327,226 A | * | 7/1994 | Tanabe ....................... | 348/188 |
| 5,673,083 A | * | 9/1997 | Izumi et al. ................ | 348/340 |
| 5,699,440 A | * | 12/1997 | Carmeli ..................... | 382/100 |
| 5,906,682 A | * | 5/1999 | Bouras et al. .............. | 118/712 |
| 6,075,601 A | | 6/2000 | Marcus et al. .............. | 356/357 |
| 6,389,687 B1 | * | 5/2002 | Glenn et al. ................. | 29/832 |
| 6,512,587 B1 | | 1/2003 | Marcus et al. .............. | 356/497 |
| 6,518,656 B1 | * | 2/2003 | Nakayama et al. ......... | 257/680 |
| 7,071,966 B1 | * | 7/2006 | Lu et al. ..................... | 348/188 |

(Continued)

FOREIGN PATENT DOCUMENTS

EP    0656731 A2    11/1994

(Continued)

OTHER PUBLICATIONS

DS-03-008, U.S. Appl. No. 10/417,317, filed on Apr. 16, 2003, assigned to the same assignee, "Miniature Camera Module".

(Continued)

*Primary Examiner*—Vivek Srivastava
*Assistant Examiner*—Nelson D. Hernandez
(74) *Attorney, Agent, or Firm*—Saile Ackerman LLC; Stephen B. Ackerman

(57) ABSTRACT

A test system and a related method to perform optical and electrical tests, to adjust the focus and to seal the lens of digital fixed-focus cameras have been achieved. Said test system is especially suited for miniature camera module to be built into consumer electronic devices as mobile phones, PDAs, etc. Said test system comprises three parts, a control system, an auto-focus head, and a XYZ robot. Said autofocus head executes the adjustment of the focus, identifies hot pixels and black level, tests the saturation level, identifies cold pixels, tests dust particles and white, blue, red, and infrared color levels. As last step the auto-focus applies glue to fix the focused lens of the camera module. Said XYZ robot performs is moving the camera modules to be tested in XY direction and is approaching the lens system of the auto-focus head in Z direction. Said control system has interfaces to both, XYZ robot and auto-focus hand and is comprising interfaces and a frame grabber.

70 Claims, 5 Drawing Sheets

U.S. PATENT DOCUMENTS

2001/0050721 A1* 12/2001 Miyake ............... 348/374
2003/0218688 A1* 11/2003 Shaw et al. ............ 348/370

FOREIGN PATENT DOCUMENTS

JP          2003051973        2/2003

OTHER PUBLICATIONS

"Low Smear CCD Camera for High Frame Rates", by B.T. Turko, IEEE Transion Nuclear Scienc, vol. 36, No. 1, Feb. 1989, 1989 IEEE pp. 165-169.

* cited by examiner

Bottom view of grip

Focusing grip

Lens barrel in the lensholder

Cross secion view

| G1 | R | G1 | R |
|----|----|----|----|
| B | G2 | B | G2 |
| G1 | R | G1 | R |
| B | G2 | B | G2 |

*FIG. 4*

TEST SYSTEM FOR CAMERA MODULES

RELATED PATENT APPLICATION

This application is related to U.S. patent application Ser. No. 10/417,317, filed on Apr. 16, 2003, and assigned to the same assignee as the present invention.

BACKGROUND OF THE INVENTION (1) Field of the Invention

The invention relates to a test system for digital miniature camera modules, and more particularly, to a system to test camera modules, to be used as built-in modules in consumer electronics as e.g. mobile phones or PDAs, performing electrical tests, adjustment of the focus, and sealing the lens barrel with glue.

(2) Description of the Prior Art

Camera modules intended to be used as built-in modules in hand-held consumer electronic devices as, e.g. mobile phones or PDAs, have to be fast and simple to be produced. Therefore said camera modules have usually a fixed-focus lens producing sharp images of objects located within a specified distance range. A typical requirement for a mobile phone camera is good focus between 0.4 m and infinity.

When such a camera is focused, perfect focus is only achieved for objects at a certain distance from the camera. Objects located at all other distances will be out of perfect focus, but may be still in acceptable focus. The term depth-of-field refers to a range over which the object can be moved and still be imaged with a blur not exceeding the acceptable one. For a fixed-focus camera having the requirement of a focus up to infinity the needed focus distance is called hyper-focal distance.

There are solutions published dealing with the testing of cameras:

U.S. Pat. No. 6,512,587 (to Marcus et al.) describes a method for determining whether an imager assembly outside of a camera body meets predetermined focus specifications, wherein the imager assembly includes an image sensor and a camera mounting plate having reference features adapted to cooperate with alignment features in the camera body to locate the image sensor at a predetermined focal plane, including the steps of: mounting the imager assembly onto an imager mounting apparatus having equivalent alignment features; and utilizing low-coherence light interferometry to determine whether the image sensor will meet predetermined focus specifications when mounted in a camera body.

U.S. Pat. No. 6,075,601 (to Marcus et al.) discloses an apparatus and method for calibrating an optical probe assembly, wherein the optical probe assembly includes a probe mounting surface and an optically transparent material spaced from the probe-mounting surface. The method includes providing a calibration apparatus, wherein the calibration apparatus includes a calibration mount having an axis and a reference surface on an exterior surface of the calibration mount. A calibration target is mounted substantially perpendicular to the calibration mount axis at a predetermined distance from the calibration mount reference surface, and a distance LR from the calibration target to the calibration mount reference surface is determined. The optical probe assembly is then removably mounted and lockably secured to the calibration apparatus such that the calibration mount reference surface is in a predetermined orientation relative to the probe-mounting surface on the optical probe assembly. Non-coherent light interferometry is used to determine a distance PR from the optically transparent material to the calibration target, and a distance LP from the probe-mounting surface to the optically transparent material using the values of LR and PR is determined.

SUMMARY OF THE INVENTION

A principal object of the present invention is to achieve a test system and a related method to test cost-efficiently digital fixed-focus cameras.

A further object of the present invention is to combine the sealing of the lens with the focusing and electrical and optical test of said cameras.

In accordance with the objectives of this invention a system to perform optical and electrical tests, to adjust the focus and to seal the lens of digital fixed-focus cameras has been achieved. Said system comprises a control system having interfaces to a robot system and to means for executing optical and electrical tests, focusing and sealing of a lens, a means of executing optical and electrical tests and focusing and sealing a lens, being controlled by said control system, comprising a fixed and a rotatable part, wherein said fixed part is comprising a light source, optical lenses, two diffusers, a test pattern, electrical connections, a glue dispenser, height gauges, and wherein the rotatable part, holding the camera module to be tested, is comprising electrical probes and a means to move and to adjust the focus of said camera modules by moving the lens barrel; and a means to move the camera modules to be tested.

In accordance with the objectives of this invention, a method to perform optical and electrical tests, to adjust the focus and to seal the lens of digital fixed-focus cameras has been achieved. Said method comprises, first, providing a control system, a means of executing optical and electrical tests and focusing and sealing a lens, comprising a fixed and a rotatable part, wherein said fixed part is comprising a light source, optical lenses, a fixed and a removable diffuser, a test pattern, electrical connections, a glue dispenser, height gauges, and wherein the rotatable part, holding the camera module to be tested, is comprising electrical probes and a means of performing the movements of the camera modules to be tested. The steps of the method invented comprise, first, to adjust the focus of the camera module, to analyze said focus, to set the lens grip free, to inset a diffuser and to identify hot pixels and black level. The following steps comprise to test the saturation level, to identify hot pixels, to test dust, to test white, infrared, blue and red level, and finally to apply glue.

BRIEF DESCRIPTION OF THE DRAWINGS

In the accompanying drawings, forming a material part of this description, there is shown:

FIG. 4 illustrates a Bayer color pattern.

DESCRIPTION OF THE PREFERRED EMBODIMENTS

Figure 1:
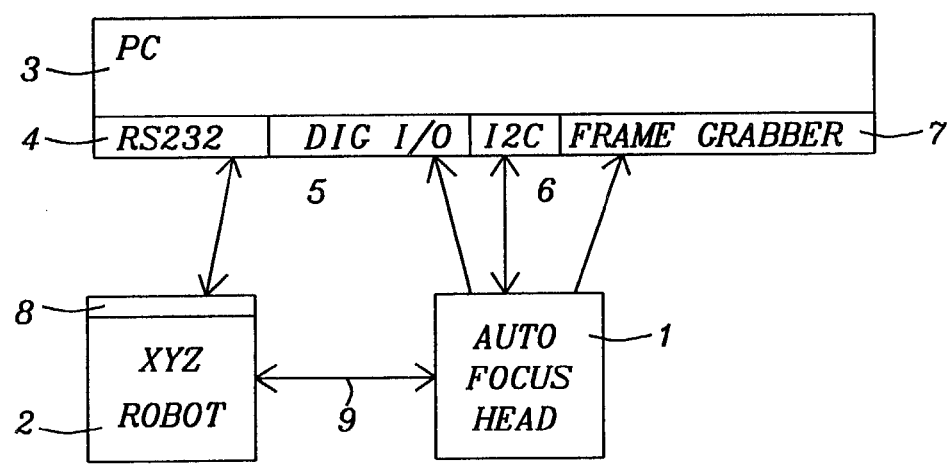
FIG. 1 shows an overview of the system invented.

Disclosed is a semi-automatic test system handling camera modules. Said test system may either connect to a single module or modules mounted on panels FIG. 1 shows the test system invented comprising three basic elements, namely an auto-focus head 1, a XYZ robot 2 and a PC-based control system 3. Said test system is able to perform a variety of optical tests and additionally it performs electrical tests, the adjustment of the focus and the sealing of the lens barrel with glue. Said PC-based control system 3 is comprising in a preferred embodiment an RS232 interface 4 to the XYZ robot 2, a digital I/O interface 5 and an I2C bus 6 to the auto focus head 1, and a frame grabber card 7 receiving input from said auto focus head. A frame grabber 7 is a device that can seize and record a single frame of image information out of a sequence of many frames. An I2C 6 bus is a two-wire serial bus used extensively in a variety of microcontroller-based professional, consumer and telecommunications applications as a control, diagnostic and power management bus. Said I2C bus is used here to communicate with the camera module and to bring it in different test modes and settings.

Said XYZ-robot 2 used moves in three different directions controlled by said PC-based control system 3. The XY-directions make it possible to move between the different camera modules on a panel or between different panels. The Z-direction is used to approach the lens system. An additional rotating movement adjusts the focus setting by turning the lens.

The XYZ-robot and the additional devices as stepper motors, hoods etc. are standard off-the shelf devices, and they have all required security functionality included.

The interface between the XYZ robot 2 and the PC-based control system 3 is of RS232 type 4 and a local motor control device 8 executes the commands sent to it. This device also provides a number of general purpose digital I/Os. Mechanical interfaces 9 are provided between the XYZ robot 2 and the auto focus head 1. The operating area of the machine will be covered by a hood to ensure staff security, to control the light flow, and to keep dust out of the working area (filtered compressed air if needed).

Figure 2:
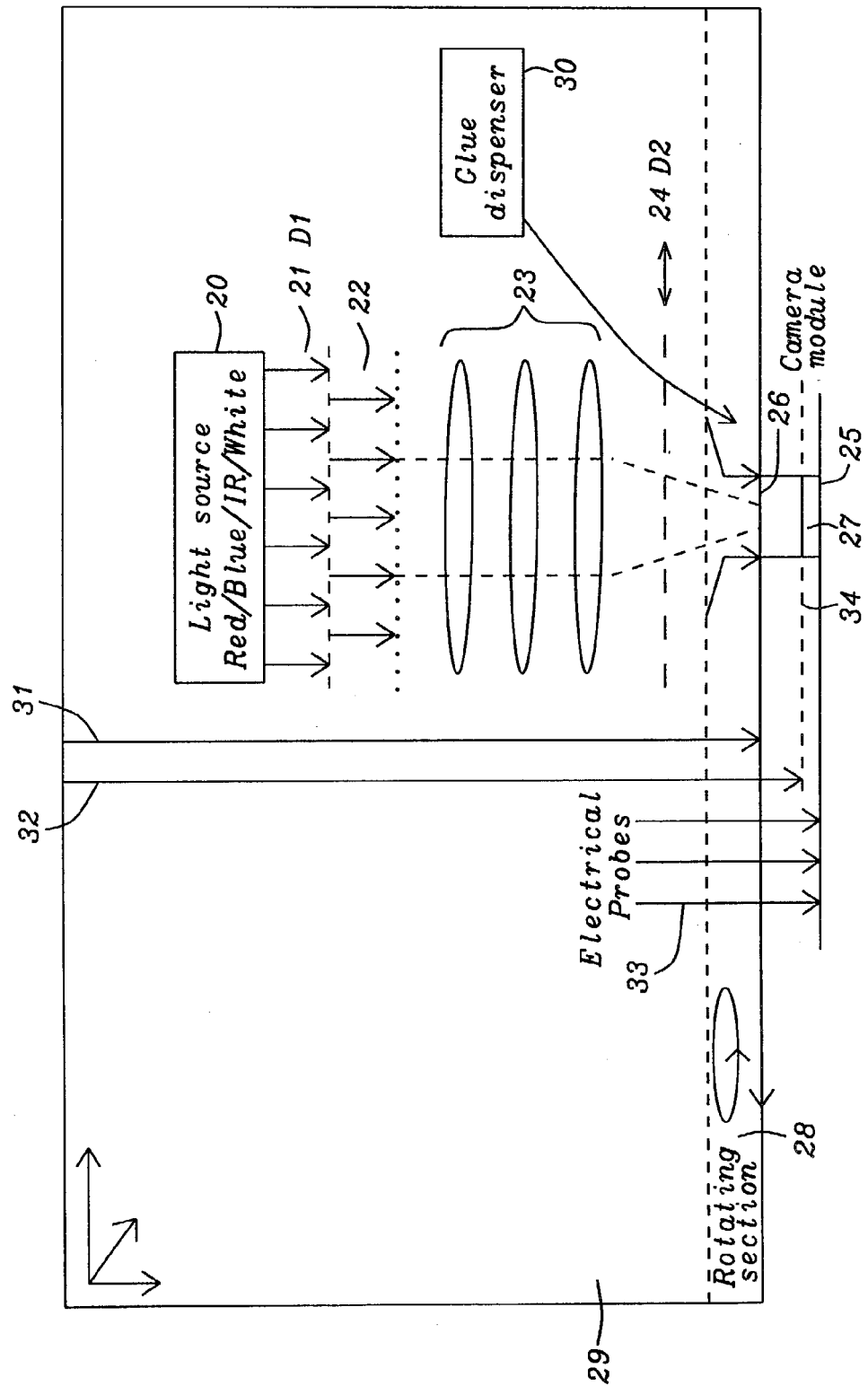
FIG. 2 discloses a schematic of an auto-focus head invented.

In a preferred embodiment of the invention the optical part of the test system is used to focus and to test the imaging performance of camera modules either singulated or mounted on panels. FIG. 2 shows a schematic of the basic parts of the auto focus head used.

Said auto focus head consists of two sections, one fixed 29 and one rotatable part 28. The rotatable 28 part is connected via a transmission to a stepper motor being a part of the XYZ-robot system described above.

Figure 3C:
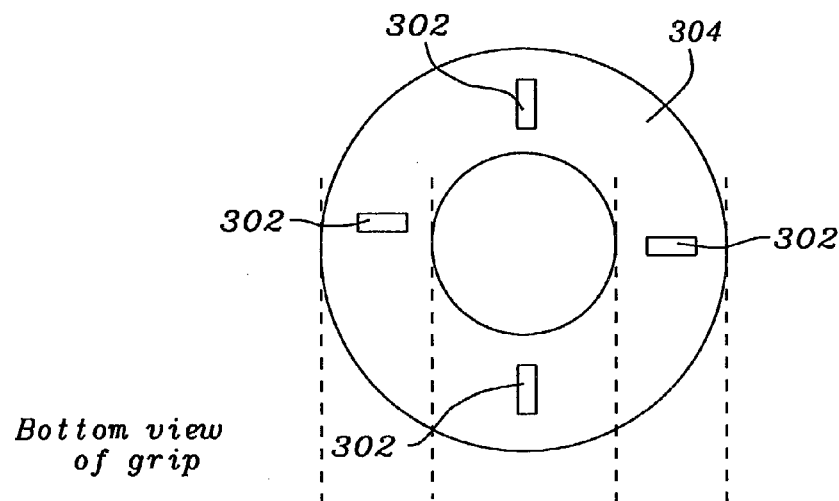
FIG. 3*a, b, c* show different views of a focusing grip and the mechanical match with a lens barrel.
Figure 3B:
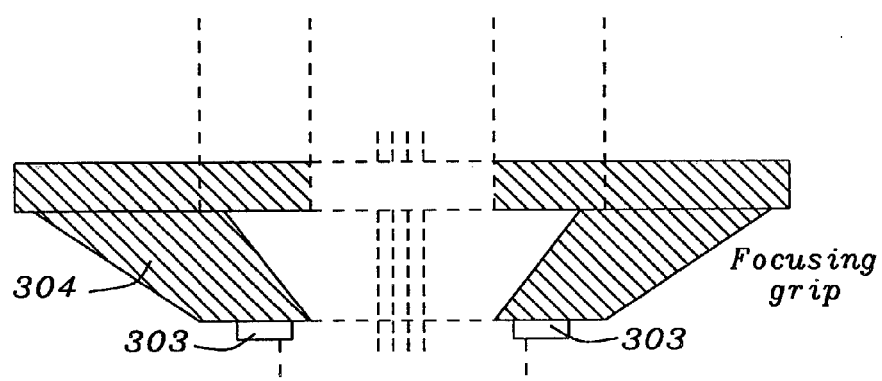
Figure 3A:
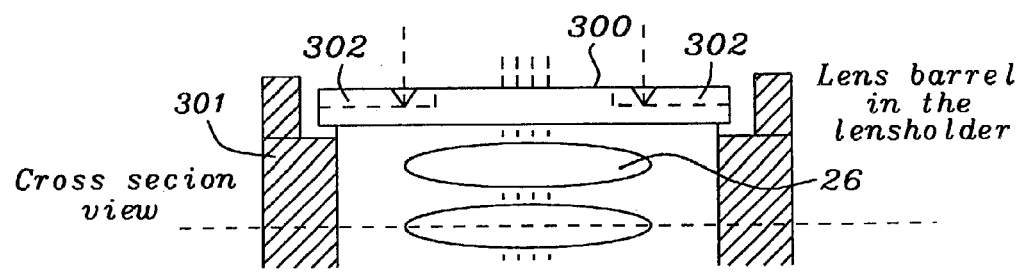

Referring now to FIG. 3a a cross section view of a part of a camera module to be tested is illustrated. FIG. 3a shows a lens barrel 300 being surrounded of a lens holder 301. Several dents 302 are provided at the top of said lens barrel 300. Said dents 302 serve as counterpart of adaptors 303 protruding the bottom side of a focusing grip 304 as shown in the cross section view of FIG. 3b. Said adaptors 303 and the dents 302 on the surface of the lens barrel 300 match in a way that the adaptors 303 can "key" into the matching dents 302 and can move said lens barrel 300 to set the lens barrel into focus. Said movement could by a rotating movement or a straight movement along an optical axis. FIG. 3C shows the bottom side of said lens grip 304, showing four adaptors 303, matching the dents 302 shown in FIG. 3a. As size and shape of the lenses and the correspondent lens barrels are changing the design of said focusing grip will differ too. The principal operation of the keying of the focusing grip into dents of the lens barrel, or vice versa, will remain.

Referring to FIG. 2 again the focusing grip, being a replaceable part of the focus head will hook into the lens barrel when the auto focus head descends over the camera module 25. Said rotatable section 28 adapts to the lens-focusing grip of the module. An algorithm of the PC-based control system uses a live picture from the camera module 25 to decide how to turn the lens 26. Said stepper motor carries out the rotation.

The fixed part 29 includes a light source 20, optical lenses 23, diffusers 21 and 24, electrical connections, glue dispensers 30, height gauges 31 and 32, etc. The lens adjustment and means for the electrical connections and distance measurements are fitted together with the glue dispenser 30 in the auto focus head. The head is mounted on a XYZ conveyor, which is part of the XYZ-robot system described above.

The optics of the test system consists of a light source 20, comprising four color LEDs, a first diffuser 21 for said light source, a transparent target 22, an imaging lens system 23 and a second removable diffuser 24.

Said LED light source 20 comprises arrays of LEDs with different wavelengths as e.g. blue (B), white (W), red (R), and infrared (IR) arranged in such a pattern that the diffuser 21 can be well and uniformly illuminated by either color. The light intensity and emitted colors are parameters controlled by the PC-based control system 3, shown in FIG. 1. The diffuser D1 21 uniforms the light intensity over the transparent target test pattern 22. In a preferred embodiment said transparent target 22 consists of black and white squares or similar in a checkerboard pattern etched in a glass lid.

Said pattern is achieved by a very thin metallic plate with square or round holes. The plate is attached to a glass lid. This arrangement provides the system with an optimal contrast. The area of the holes is approximately equal the area of the metal. It is desirable to have as many transactions between white and black as possible.

Each square has in a preferred embodiment a side of about 20 pixels when imaged by the camera module 25 to be tested. The target is large enough to fill the whole field-of-view.

The system is calibrated using a "golden" sample camera module that is pre-focused at a defined distance close to the hyper-focal distance. The distance between the target 22 and the imaging lens 12 should be adjusted so that the pre-focused "golden" camera will give images of the target in perfect focus.

The purpose of the secondary removable diffuser D2 24 is to illuminate the sensor 27 with nearly homogenous light to measure if the lens system and sensor is clean, if cold pixels are present, and the spectral response using LEDs of the light source 20. The detection of dust and of cold pixels is performed using white light while the spectral response is measured using all four different colors, white, blue red, and infrared, of the light source 20.

The electrical connection is achieved via probing needles 33. Every signal from the flexi-strip is connected. For panel-mounted camera modules it is possible to probe "internal signals" of the camera module 25.

A level sensor 31 measures the current distance between the auto focus head 1 and the lens 26 of the camera module. Another level sensor 32 measures the current distance between the auto focus head and the image plane 34. Said measurement prevents damage of the lens and of the module itself. The difference of the measurement of both gauges 31 and 32 indicates the current distance from the image plane to the top of the lens.

The glue dispenser 30 dispenses the glue when the focus setting is finished and approved.

The tests of the camera units are performed generally using an image processor as part of the camera module. Said processor is set up to provide a Quarter Video Graphics Array (QVGA) output of maximum color depth for red (R), green (G), and blue (B) having each (6, 6, 5) bits. In a preferred embodiment an image processor is used capable to handle up to 30 frames per second (fps). Thus R, G1 and B of the Bayer Pattern are directly available for measurements.

Alternatively it is possible to test camera modules having no image processor included. In this case the tests are applied on the raw images delivered from the image sensor. The only differences to the process using an image processor is that instead of using an I2C bus a SPI-bus is used and that the Bayer pattern image is available directly.

Figure 4:
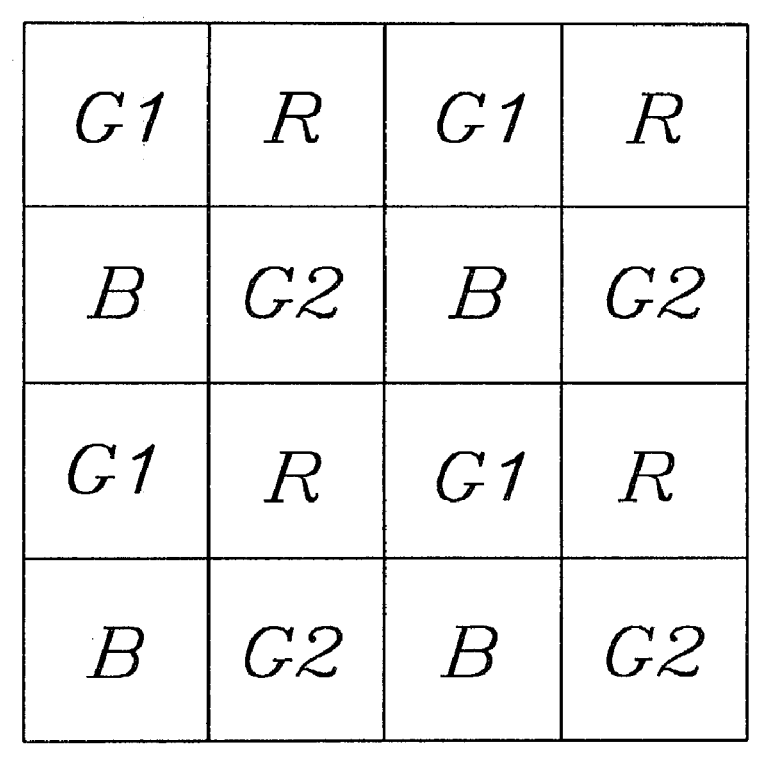

FIG. 4 shows the well-known Bayer pattern comprising the locations and the distribution of R, G1, G2 and B. If another image is taken with a shift of 1 pixel left/right and a shift of 1 pixel up/down also G2 can be measured. Said shift is used to identify bad pixels.

Figure 5:
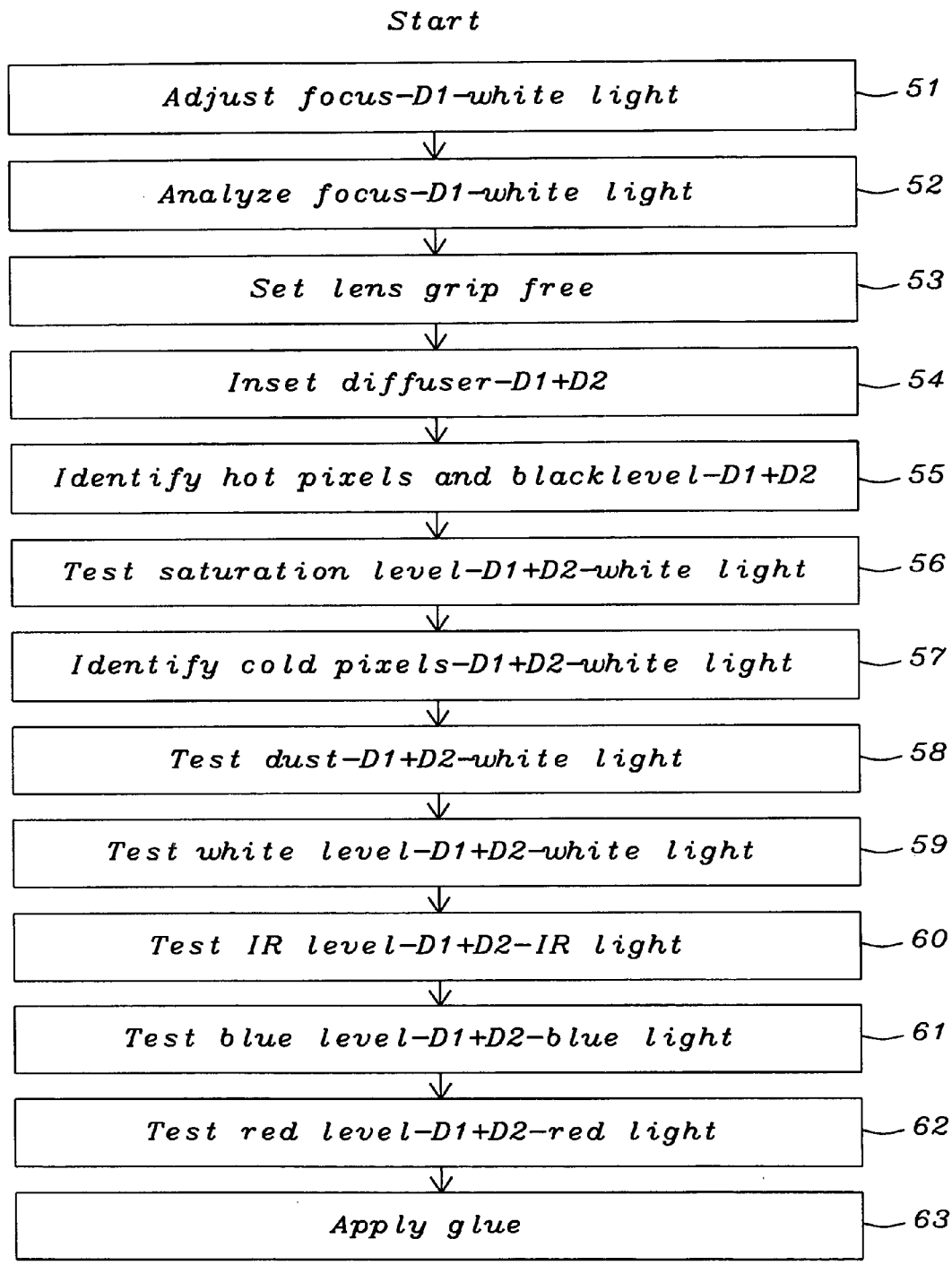
FIG. 5 shows a flowchart of the method invented.

FIG. 5 shows the steps of the method invented to test a fixed focus camera including to set and to fix the focus of said camera.

The first step 51 of the flowchart of FIG. 5 action is to adjust the focus of the camera module to be tested. Said step is performed using diffuser D1 21 shown in FIG. 2 and a white light source. In a preferred embodiment a test window of 100×100 pixels in the green channel of said QVGA image of said image processor is used. In this window a standard Sobel edge detection operator is used to generate an estimate of the edge content of the test window. Said Sobel edge detection produces an image where higher grey-level values indicate the presence of an edge between two objects. The Sobel Edge Detection operator computes the root mean square of two 3×3 templates. Besides the Sobel edge detection operator other edge detection methods could be used as well, as e.g. Canny-, Prewitt compass-, or Roberts edge detection method.

The sum of the pixel values are taken and measured at a multitude of the current focus positions. The lens position giving the highest possible focus value is the correct focus position.

The following step 52 covers the analysis of the focus. Said step is performed using diffuser D1 21 shown in FIG. 2 and a white light source. For the image obtained at best possible focus (as described above) five sub-windows are being analyzed. They are e.g. 100×100 pixel windows located at the corners and in the middle of the image. Each sub-image is normalized by its average brightness by dividing each pixel value by the measured average value. After normalization each window is measured the same way as during the above-described adjustment of focusing. The focus measurements are compared with the same measurements for the golden sample. Units showing a difference larger than the tolerances are rejected.

The following process steps require a second removable diffuser 24 as shown in FIG. 2. Said diffuser 24 can only be inserted in a slot of the focusing head. Thus, in step 53, the head has to be put in a certain position before the diffuser 24 can be inserted as described by step 54. Accordingly the whole focusing head has to be lifted until the focusing grip loose the contact with the lens. Otherwise the turning of the focusing head would destroy the focus already achieved.

The next step 55 of the test flow is the identification of hot pixels and black-level of the image sensor of the camera module to be tested. Said step is performed using diffuser D1 21 and the removable diffuser D2 24 shown in FIG. 2. The light source is off in this step. The black level can be defined as the level corresponding to the specified maximum excursion of the luminance signal in the black direction. Hot pixels are pixels with a brightness exceeding a defined threshold. An image processor prior to the measurement automatically subtracts the black-level. The number found is logged and compared to a defined number. The black-level is read from registers of the image processor and stored for future reference. In case the number of hot pixels exceeds a maximum allowed number the test is stopped and the camera module is rejected.

In the following step 56 the saturation level of the pixels is measured. Said step is performed using white light and diffuser D1 21 and the removable diffuser D2 24 shown in FIG. 2. The saturation level defines a threshold level of illumination, above which the pixel output will add no information about the image received by that pixel (the pixel has reached it's saturation level). That means that two different illumination levels, which are above the sensor saturation level, will have the same electronic output. The image recorded during the saturation test is exposed in a way that most or all pixels are at saturation level. The average output of a 100×100 pixel window that is centered on the device is thus a measure of the saturation level. This level is likely to be lower than maximum for the bit depth. This value is stored for future reference. The difference between the saturation level and the black level (see above) is stored as well. If said difference does not exceed a defined threshold the unit should be rejected.

In a following step 57 of the test flow cold pixels can be identified. Said step is performed using white light and diffuser D1 21 and the removable diffuser D2 24 shown in FIG. 2. Cold pixels are isolated pixels with brightness below a defined percentage of the local image level. The local image level is used rather than the average image level due to vignetting and non-uniformities in the illumination. The number found is logged and compared to a set acceptable number, which is configured in the IMAGE processor. The local image level is found by an averaging filter.

In the next step 58 dust can be identified. Said step is performed using white light and diffuser D1 21 and the removable diffuser D2 24 shown in FIG. 2. Dust is identified using the same image as was analyzed for cold pixels above. Dust is visible as small dark structures on the bright illuminated surface. Dust is defined as a coherent area with a size of more than a predefined number of pixels wherein all of those pixels are darker than the local image level by a defined percentage. The local image level is found by an averaging filter. This filter must have a lower frequency cutoff than the expected largest dust grains.

The following steps 59, 60, 61, and 62 comprise a subsequent analysis of the white (W), blue (B), Red (R), and infrared (IR) level. Said steps are performed using diffuser D1 21 and the removable diffuser D2 24 shown in FIG. 2 and white, blue, red, or infrared light according to the spectral analysis performed. Said levels are all being measured as the average in a 100×100 window centered in the image. Said four values are being checked for saturation by comparing with the saturation level found in step above. If any of them is saturated an error message will be generated. Otherwise the four different measurements (white (W), blue (B), red (R), and infrared (IR)) are being normalized by white and this should be repeated per color channel of the Bayer pattern (R, G, B). The result should be compared to the results obtained by the golden sample. If they differ more than a set of thresholds (12 thresholds totally, W, B, R, IR for R, G, B), the unit will be rejected.

While the invention has been particularly shown and described with reference to the preferred embodiments thereof, it will be understood by those skilled in the art that various changes in form and details may be made without departing from the spirit and scope of the invention.

What is claimed is:

1. A system to perform optical and electrical tests, to adjust the focus and to seal the lens of digital fixed-focus cameras comprising:
    a control system having interfaces to a robot system and to means for executing optical and electrical tests, focusing and sealing of a lens;
    a means of executing optical and electrical tests and focusing and sealing a lens, being controlled by said control system, comprising a fixed and a rotatable part, wherein said fixed part is comprising a light source, optical lenses, two diffusers, a test pattern, electrical connections, a glue dispenser, height gauges, and wherein the rotatable part, holding the camera module to be tested, is comprising electrical probes and a means to move and to adjust the focus of said camera modules by moving the lens barrel; and
    a means to move the camera modules to be tested.

2. The system of claim 1 wherein said control system is a PC-based control system.

3. The system of claim 2 wherein said PC-based control system comprises a RS232 interface to a means of performing the movements of the camera module to be tested.

4. The system of claim 2 wherein said PC-based control system is comprising a digital I/O interface to said means of executing optical and electrical tests.

5. The system of claim 2 wherein said PC-based control system comprises a two-wire serial bus interface to a means of executing optical and electrical tests.

6. The system of claim 2 wherein said PC-based control system is comprising a frame grabber to seize and record the image information provided by said means of executing optical and electrical tests.

7. The system of claim 1 wherein said light source comprises arrays of LEDs.

8. The system of claim 7 wherein said arrays of LEDs comprise LEDs of different colors.

9. The system of claim 8 wherein said arrays of LEDs comprise LEDs having red, blue, infrared, and white color.

10. The system of claim 1 wherein one of two said diffusers is removable.

11. The system of claim 1 wherein said test pattern is achieved by a very thin metallic plate with holes attached to a transparent glass lid.

12. The system of claim 11 wherein the area of holes is approximately equal to the area of metal.

13. The system of claim 11 wherein said test pattern is a chessboard pattern.

14. The system of claim 12 wherein said test pattern is a pattern of round circles.

15. The system of claim 1 wherein one of said two height gauges measures the distance between the lens of the camera module and said means of executing optical and electrical tests.

16. The system of claim 1 wherein one of said two height gauges measures the distance between the image plane of the camera module and said means of executing optical and electrical tests.

17. The system of claim 1 wherein said camera module is mounted together with other camera modules on a panel.

18. The system of claim 1 wherein said means to move the camera modules is a XYZ robot.

19. The system of claim 18 wherein said robot moves the different camera modules in XY direction.

20. The system of claim 18 wherein said robot moves said means of executing optical and electrical tests to and from the lens system in Z direction.

21. The system of claim 18 wherein said robot is providing a rotating movement to said means to move and adjust the focus of the camera modules.

22. The system of claim 1 wherein said means to move and to adjust the focus is a lens grip having protruding adaptors on the bottom side matching dents on the top side of the lens barrel to be tested.

23. The system of claim 1 wherein said means to move and to adjust the focus is a lens grip having dents on the bottom side matching protruding adaptors on the top side of the lens barrel to be tested.

24. The system of claim 1 wherein said camera module is a single module.

25. A method to perform optical and electrical tests, to adjust the focus and to seal the lens of digital fixed-focus cameras comprising:
    providing a control system, a means of executing optical and electrical tests and focusing and sealing a lens, comprising a fixed and a rotatable part, wherein said fixed part is comprising a light source, optical lenses, a fixed and a removable diffuser, a test pattern, electrical connections, a glue dispenser, height gauges, and wherein the rotatable part, holding the camera module to be tested, is comprising electrical probes and a means of performing the movements of the camera modules to be tested;
    adjust focus of the camera module;
    analyze said focus;
    set lens grip free;
    inset diffuser;
    identify hot pixels and black level;
    test saturation level;
    identify hot pixels;
    test dust;
    test white level;
    test infrared level;
    test blue level;
    test red level; and
    apply glue.

26. The method of claim 25 wherein said focus adjustment is performed using white light and said fixed diffuser.

27. The method of claim 25 wherein said focus adjustment is performed comprising:
    use a test window in a channel of the QVGA image;
    use an edge detector operator to generate an estimate of the edge content of the test window;
    use the sum of the pixel values of the edge detector operator image as a relative measure of the current image;
    take more images and measure said sum of pixel values at a multitude of lens positions; and
    select the lens position yielding the highest focus value as the correct focus position.

28. The method of claim 27 wherein said test window is a 100×100 pixel window.

29. The method of claim 27 wherein said channel of a QVGA image is the green channel.

30. The method of claim 27 wherein said edge detector is a Sobel edge detector.

31. The method of claim 27 wherein said edge detector is a Canny edge detector.

32. The method of claim 27 wherein said edge detector is a Prewitt compass edge detector.

33. The method of claim 27 wherein said edge detector is a Roberts edge detector.

34. The method of claim 25 wherein said focus analysis is performed using white light and said fixed diffuser.

35. The method of claim 25 wherein said focus analysis is performed comprising:
   take sub-images at best focus position;
   normalize each sub-window by its average brightness;
   identify the sum of the pixel values using an edge detection operator; compare results with same measurement of a "golden" sample; and
   reject camera module if the difference between golden sample and actual camera module is greater than a defined tolerance.

36. The method of claim 35 wherein five sub-images are taken.

37. The method of claim 36 wherein said five sub-images are taken at all corners at the middle of the image.

38. The method of claim 35 wherein the size of said sub-images is 100×100 pixels.

39. The method of claim 35 wherein said edge detector is a Sobel edge detector.

40. The method of claim 35 wherein said edge detector is a Canny edge detector.

41. The method of claim 35 wherein said edge detector is a Prewitt compass edge detector.

42. The method of claim 35 wherein said edge detector is a Roberts edge detector.

43. The method of claim 25 wherein said identification of hot pixels and black level is performed using both said fixed and removable diffusers and having the light source off.

44. The method of claim 25 wherein said identification of hot pixels and black level comprises:
   subtract black level prior to measurement of brightness;
   log brightness found and compare it with a predefined number; and
   If tolerances are exceeded unit is rejected.

45. The method of claim 44 wherein said subtraction of the black level is performed by a processor.

46. The method of claim 25 wherein said test of the saturation level is performed using both said fixed and removable diffusers and white light.

47. The method of claim 25 wherein said test of the saturation level comprises:
   expose a sub-image in a way so that most of the pixels are at saturation level;
   store average measured output as measure of the saturation level;
   store difference between said saturation level and the black level measured at previous step; and
   if said difference does not exceed a defined threshold the camera module is rejected.

48. The method of claim 47 wherein said sub-image is a 100×100 windows taken in the center of the image.

49. The method of claim 25 wherein said identification of cold pixels is performed using both said fixed and removable diffusers and white light.

50. The method of claim 25 wherein said identification of cold pixels is performed using a local image level.

51. The method of claim 50 wherein said local image is obtained using an averaging filter.

52. The method of claim 25 wherein said test of dust particles is performed using both said fixed and removable diffusers and white light.

53. The method of claim 25 wherein said test of dust particles is performed using a local image level.

54. The method of claim 53 wherein said local image is obtained using an averaging filter.

55. The method of claim 25 wherein said test of the white level is performed using both said fixed and removable diffusers and white light.

56. The method of claim 25 wherein said test of white level comprises:
   take a sub-window;
   check saturation level of said sub-window by comparing with the saturation level of previous test of the saturation;
   generate error message if said sub-window is saturated;
   otherwise normalize result with white red, green and blue color channel;
   compare normalized values with results of golden sample; and
   reject unit if one of the comparison results differs from a set of related thresholds.

57. The method of claim 56 wherein said sub-window has the size of 100×100 pixels.

58. The method of claim 56 wherein said sub-window is centered in the image.

59. The method of claim 25 wherein said test of the blue level is performed using both said fixed and removable diffusers and blue light.

60. The method of claim 25 wherein said test of blue level comprises:
   take a sub-window;
   check saturation level of said sub-window by comparing with the saturation level of previous test of the saturation;
   generate error message if said sub-window is saturated;
   otherwise normalize result with white red, green and blue color channel;
   compare normalized values with results of golden sample; and
   reject unit if one of the comparison results differs from a set of related thresholds.

61. The method of claim 60 wherein said sub-window has the size of 100×100 pixels.

62. The method of claim 60 wherein said sub-window is centered in the image.

63. The method of claim 25 wherein said test of the red level is performed using both said fixed and removable diffusers and red light.

64. The method of claim 25 wherein said test of red level comprises:
   take a sub-window;
   check saturation level of said sub-window by comparing with the saturation level of previous test of the saturation;
   generate error message if said sub-window is saturated;
   otherwise normalize result with white red, green and blue color channel;
   compare normalized values with results of golden sample; and
   reject unit if one of the comparison results differs from a set of thresholds.

65. The method of claim 64 wherein said sub-window has the size of 100×100 pixels.

66. The method of claim 65 wherein said sub-window is centered in the image.

67. The method of claim 25 wherein said test of the infrared level is performed using both said fixed and removable diffusers and infrared light.

68. The method of claim 25 wherein said test of infrared level blue level comprises:

take a sub-window;

check saturation level of said sub-window by comparing with the saturation level of previous test of the saturation;

generate error message if said sub-window is saturated;

otherwise normalize result with white red, green and blue color channel;

compare normalized values with results of golden sample; and reject unit if one of the comparison results differs from a set of thresholds.

69. The method of claim 68 wherein said sub-window has the size of 100×100 pixels.

70. The method of claim 68 wherein said sub-window is centered in the image.

* * * * *